United States Patent [19]
Karl

[11] Patent Number: 6,109,046
[45] Date of Patent: *Aug. 29, 2000

[54] AIR CONDITIONING APPARATUS FOR A VEHICLE WITH A HEATING LOOP INCLUDING A VARIABLE OUTPUT COMPRESSOR

[75] Inventor: Stefan Karl, Paris, France

[73] Assignee: Valeo Climatisation, La Verriere, France

[*] Notice: This patent issued on a continued prosecution application filed under 37 CFR 1.53(d), and is subject to the twenty year patent term provisions of 35 U.S.C. 154(a)(2).

[21] Appl. No.: 08/969,441

[22] Filed: Nov. 12, 1997

[30] Foreign Application Priority Data

Nov. 12, 1996 [FR] France ................................. 96 13752

[51] Int. Cl.⁷ ............................. F25B 41/00; F25B 49/00
[52] U.S. Cl. ........................................ 62/196.4; 62/324.4
[58] Field of Search ............................... 62/196.4, 324.4, 62/228.5

[56] References Cited

U.S. PATENT DOCUMENTS 4,977,751 12/1990 Hanson ........................................ 62/81
5,291,941 3/1994 Enomoto et al. ........................... 165/62
5,499,511 3/1996 Hara et al. ................................ 62/228.4
5,557,938 9/1996 Hanson et al. ...................... 62/228.4 X

FOREIGN PATENT DOCUMENTS 0 691 229   1/1996   European Pat. Off. .
0 736 402   10/1996  European Pat. Off. .
2731952     3/1995   France .
2717126     9/1995   France .

OTHER PUBLICATIONS

German Search Report (197 46 773.3).

*Primary Examiner*—William Wayner
*Attorney, Agent, or Firm*—Morgan & Finnegan, L.L.P.

[57] ABSTRACT

In a motor vehicle air conditioning apparatus, the fluid flowing in the circuit of the apparatus flows in a bypass branch, bypassing the condenser, in a heating mode of the apparatus. The evaporator then receives the fluid in a gaseous state and acts as a heat exchanger for dissipating the heat produced in the compressor. The heat dissipated by the evaporator can be used for heating the cabin when that produced by the engine of the vehicle is insufficient. A control unit provides special control of the variable capacity of the compressor which is compatible with the heating mode.

19 Claims, 1 Drawing Sheet

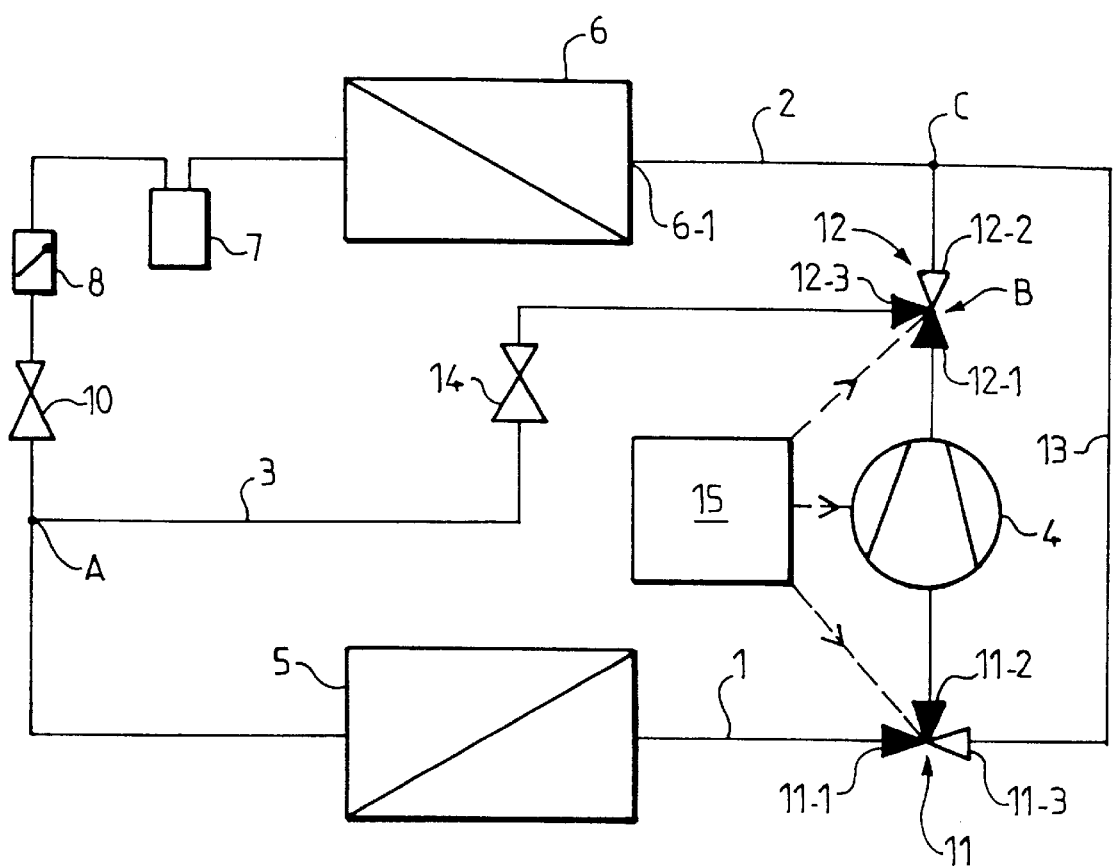

AIR CONDITIONING APPARATUS FOR A VEHICLE WITH A HEATING LOOP INCLUDING A VARIABLE OUTPUT COMPRESSOR

FIELD OF THE INVENTION

This invention relates to air conditioning apparatus for the cabin of a motor vehicle comprising a refrigerant fluid circuit having a first branch containing an evaporator followed by a compressor, a second branch containing a condenser, and a third branch containing no condenser, the said second and third branches being connected in parallel with each other so as to form, with the first branch, respectively, a cooling loop which also contains an expansion device interposed between the condenser and the evaporator, and a heating loop, the apparatus further comprising means for delivering into the cabin a stream of air which has undergone heat exchange with the evaporator, together with fluid switching means for passing fluid from the first branch selectively into the second branch, whereby to establish a cooling mode for cooling the air stream, or into the third branch so as to establish a heating mode for heating the air stream.

BACKGROUND OF THE INVENTION

Such apparatuses are described in French patent specifications numbers FR2717126A and FR2731952A.

In some types of vehicle air conditioning apparatus, the compressor is of the variable capacity, or variable output, type, that is to say the volume of fluid which it aspirates on each revolution is adjustable. Adjustment of the capacity of the compressor enables the flow of refrigerant fluid to be adapted to the requirements, or demand, for cooling, i.e. extraction of heat. It also enables variations the speed of the engine of the vehicle to be compensated for, having regard to the fact that engine speed also affects the running speed of the compressor.

Variable capacity compressors commercially available generally incorporate adjusting mechanisms which react in particular to values of the pressure of the fluid in the circuit. These regulating mechanisms have not given correct operation of an apparatus of the type envisaged by the invention in the heating mode. In particular, when the air conditioning apparatus is started up, the pressure prevailing in the refrigerant fluid circuit may be high, being for example of the order of ten bars. Having regard to this high pressure, the compressor sets its capacity at the maximum value so as to reduce the pressure. The capacity is then adjusted so as to bring the pressure to a set or demand value, for example three bars, so as to prevent any icing up of the evaporator.

In the case where the air conditioning apparatus also includes a heating loop, the pressure of the refrigerant fluid, which depends on atmospheric temperature, is for example 1.4 bar for a temperature of −20° C. during starting up of the apparatus in the heating mode. The conventional method of regulating the output of the compressor would fix this pressure at its minimum value, giving a very small mass flow and very low heating efficiency.

DISCUSSION OF THE INVENTION

The object of the invention is to make an air conditioning apparatus with a heating loop and a variable capacity compressor compatible with each other.

According to the invention, air conditioning apparatus for the cabin of a motor vehicle, comprising a refrigerant fluid circuit having a first branch containing an evaporator followed by a compressor, a second branch containing a condenser, and a third branch containing no condenser, the said second and third branches being connected in parallel with each other so as to form, with the first branch, respectively, a cooling loop which also contains an expansion device interposed between the condenser and the evaporator, and a heating loop, the apparatus further comprising means for delivering into the cabin a stream of air which has undergone heat exchange with the evaporator, together with fluid switching means for passing fluid from the first branch selectively into the second branch, whereby to establish a cooling mode for cooling the air stream, or into the third branch so as to establish a heating mode for heating the air stream, is characterised in that the compressor is of a variable capacity type, and in that control means are provided for ensuring specific control of the output of the compressor when the fluid switching means cause the fluid to flow in the third branch.

The variation in the capacity of the compressor can of course perform its usual function when the fluid is flowing in the second branch, that is to say in the cooling mode of operation of the circuit.

Preferably, the said control means work in such a way as to impose the maximum value on the output of the compressor, at least during starting of the apparatus in the heating mode. In some embodiments of the invention, the said control means then act on the compressor in such a way as to employ a mechanism included in the compressor so as to impose the maximum value on its output. The said control means may act on the compressor by short-circuiting a regulating valve incorporated in the compressor; alternatively, the control means may act on the compressor by acting directly on an adjusting valve of the latter.

The said control means may act in such a way as to impose the maximum value on the output of the compressor so long as the apparatus is operating in its heating mode.

According to a preferred feature of the invention the said control means act, at least after a transitional period beginning with starting of the apparatus in the heating mode, in such a way as to regulate the output of the compressor, and consequently the flow rate of fluid in the heating loop, as a function of heating demand.

Means are preferably provided for transferring fluid from the second branch to the heating loop and/or vice versa, in such a way as to regulate the quantity of fluid flowing in the heating loop, and consequently the mass flow of the said fluid, in accordance with heating demand.

According to another preferred feature of the invention, the control means employ a sensor for sensing the temperature of a stream of air which is passed through the evaporator, for adjustment of the output of the compressor in such a way as to bring the said temperature to a desired value, or to maintain it at that value.

Further features and advantages of the invention will appear more clearly on a reading of the following detailed description of a preferred embodiment of the invention, which is given by way of example only and by reference to the accompanying drawing.

BRIEF DESCRIPTION OF THE DRAWING

The drawing is a circuit diagram of a refrigerant fluid circuit in an apparatus according to the invention for air conditioning and heating the cabin of a motor vehicle, derived from the circuit described in French patent specification number FR 2 731 952 A.

DESCRIPTION OF PREFERRED EMBODIMENT OF THE INVENTION

In the drawing, the components of the circuit are distributed in three branches 1, 2 and 3, which are joined together at two junction points A and B. The branch 1 contains a variable capacity compressor 4 which drives the fluid in that branch from the point A towards the point B, together with an evaporator 5 which is connected in the branch 1 upstream of the compressor. The branch 2 contains, considered from the point B towards the point A, a condenser 6, a bottle or reservoir 7, a non-return valve 8, and a first expansion device 10. A second expansion device is connected in the branch 3.

A first three-way valve 11 is interposed in the branch 1, in such a way that two of its valve ports, 11-1 and 11-2, are in communication, respectively, with the outlet of the evaporator 5 and the inlet of the compressor 4. A second three-way valve 12 is located at the junction point B, so that its three valve ports 12-1, 12-2 and 12-3 are connected respectively to: the downstream end of the first branch, that is to say to the outlet of the compressor 4; to the upstream end of the second branch, that is to say to the inlet of the condenser 6; and to the upstream of the third branch, that is to say to the inlet end of the second expansion device 14. A fourth branch 13, containing no components, connects a third valve port 11-3 of the electromechanical valve 11 to an intermediate point C in the branch 2, which is located between the second valve port 12-2 of the valve 12 and the condenser 6.

The electromechanical valves 11 and 12 are controlled in coordination with each other by a control unit 15 which is such as to be able to put the circuit selectively into three different configurations. In the first of these configurations, each of the two valves 11 and 12 puts its valve ports 1 and 2 into communication with each other as indicated by the two black triangles for each valve in FIG. 1. The fluid then flows in a closed loop which is constituted-by the branches 1 and 2, with the branch 3 and the branch 13 being isolated by the valves 12 and 11 respectively. This loop operates as a cooling lookp, as in a conventional air conditioning circuit, with the fluid passing from the liquid state to the gaseous state in the evaporator 5 by absorbing heat. It passes from the gaseous state to the liquid state in the condenser 6, in which it yields heat. The heat absorbed in the evaporator 5 may be taken, directly or indirectly, into a stream of air to be delivered into the cabin of the vehicle. The fluid pressure can be regulated by varying the capacity of the compressor 4.

In the particular configuration shown in the drawing, the valve 11 again puts its valve ports 1 and 2 into communication with each other, but the valve 12 this time puts its valve ports 12-1 and 12-3 into communication with each other. The fluid then flows in a closed heating loop consisting of the branches 1 and 3, the branch 2 and the branch 13 being isolated by the valves 12 and 11 respectively. The fluid then passes through the compressor 4, the evaporator 5 and the expansion device 14. Since it no longer passes through the condenser, the fluid remains in the gaseous state. The evaporator 5 now no longer acts as an evaporator, but continues to act as a heat exchanger, enabling most of the heat produced by compression of the fluid in the compressor 4 to be dissipated. This heat can be used for heating the cabin when the engine of the vehicle is cold. In particular, where the fluid flowing is at a temperature higher than ambient, a stream of air to be delivered into the cabin can be heated directly in contact with the evaporator.

In a third configuration which is not shown, the valves 11 and 12 provide communication firstly between the valve ports 11-3 and 11-2, and secondly between the valve ports 12-1 and 12-3. The inlet of the compressor is then connected through the branch 13 to the normal inlet 6-1 of the condenser 6, from which it can extract fluid in the gaseous state. This fluid then flows in the branch 3, but is unable to reach the condenser from the point A, in particular because of the presence of the non-return valve 8. The fluid then reaches the evaporator 5, in which it is accumulated, since the valve 11 affords no communication between the outlet of the evaporator and the inlet of the compressor. The mass of fluid which will flow in the branches 1 and 3 after the configuration of the circuit shown in the drawing has been re-established is thus augmented.

Conversely, the first configuration of the circuit can be established momentarily in order to enable the compressor to pass fluid back into the condenser, thus reducing the mass of fluid flowing in the circuit after the latter has reverted to the configuration shown in the drawing.

The control unit 15 also acts on the compressor 4 when the compressor is in the configuration shown. The effect of this action may, in particular, be to impose the maximum value of the compressor capacity during start-up of the apparatus, so as to enable the fluid pressure to be raised at low temperature. In order to impose the maximum value of the/compressor capacity, the control unit 15 is able to act on a mechanism (not shown) which is provided for this purpose in the compressor, for example by short-circuiting a regulating valve or by acting directly on the latter. The maximum capacity can be maintained by the control unit 15 during the whole time in which the apparatus is functioning in its heating mode. In that case, any adjustment of the heat output according to demand will be obtained exclusively by modifying the quantity of fluid flowing in the heating loop, by operating the valves 11 and 12 so as to establish, temporarily, the first and/or the third configuration described above.

The control unit 15 may also, after an initial period in which the compressor operates at an unvarying level, provide adjustment of the compressor output in such a way as to optimise the amount of heat produced for heating purposes.

Variation of the output of the compressor can be combined with the variation, in the manner described above, of the quantity of fluid contained in the heating loop, so as to widen the range for adjustment of heat output. Various inlet parameters can be employed by the control unit 15 for controlling the output of the compressor 4. For example, the output may be adjusted in such a way as to put the temperature of the stream of air that has passed through the evaporator 5 at a desired value, and/or to maintain it at that value.

In another version, the valve 11 and the branch 13 may be omitted, so as to give a circuit which is equivalent to those described in French patent specification number FR 2 717 126 A, (apart from the fact that the compressor capacity or output is variable here). Such a circuit does not enable fluid to be transferred from the second branch into the heating loop in order to increase the mass flow of fluid flowing in the latter. This result is then obtained exclusively by adjustment of the compressor output by the control unit 15.

The variation in the mass flow of the fluid flowing in the heating loop produces a more rapid effect on the calorific power when it is obtained by adjustment of the compressor output, than when it is obtained by fluid transfer, due in particular to the fact that it necessitates no interruption in the flow of fluid in the heating loop.

What is claimed is:

1. An apparatus for controlling air temperature in a cabin of a motor vehicle, comprising a fluid circuit having a first branch, a second branch, and a third branch, an evaporator and a variable capacity compressor in the first branch, a condenser in the second branch, the second and third branches being in parallel with each other, and being coupled in fluid communication with the first branch so as to constitute with the first branch, respectively, a cooling loop and a heating loop, an expansion device interposed between the condenser and the evaporator in the cooling loop, a fluid flow switching valve coupled with the first, second and third branches for selectively passing fluid from the first branch into the second branch and from the first branch to the third branch, a control unit coupled to the compressor for providing specific control of the output capacity of the compressor, whereby the fluid flow rate in the heating loop may be regulated by varying the output capacity of the compressor and selectively transferring fluid from the heating loop to the second branch when the apparatus is operating in a heating mode.

2. The apparatus according to claim 1, wherein the control unit is adapted to impose the maximum value of the compressor capacity at least during start up of the apparatus in the heating mode.

3. The apparatus according to claim 2, wherein the compressor includes a mechanism for imposing the maximum value of the capacity on the compressor, the control unit being adapted to actuate the mechanism.

4. The apparatus according to claim 3, wherein the compressor includes a regulating valve normally adapted to restrict the output capacity of the compressor when the apparatus is operating in the heating mode, the control unit being adapted to override the regulating valve and selectively impose the maximum value of the compressor capacity.

5. The apparatus according to claim 3, wherein the compressor includes a regulating valve normally adapted to restrict the output capacity of the compressor when the apparatus is operating in the heating mode, the control unit being adapted to act directly on the regulating valve to selectively vary the compressor capacity.

6. The apparatus according to claim 2, wherein the control unit is adapted to impose the maximum value of the capacity of the compressor when the apparatus is operating in the heating mode.

7. The apparatus according to claim 1, wherein the control unit is further coupled to the fluid flow switching valve for providing specific control of the transfer of fluid from the heating loop to the second branch when the apparatus is operating in the heating mode.

8. The apparatus according to claim 1, wherein the control unit includes a temperature sensor for sensing the temperature of a stream of air which has passed through the evaporator, the control unit being adapted to adjust the capacity of the compressor in response to the temperature sensed by the sensor, whereby to achieve and maintain the temperature of the stream of air at a desired value.

9. An apparatus for controlling air temperature in a cabin of a motor vehicle, comprising a fluid circuit having a first branch, a second branch, and a third branch, an evaporator and a variable capacity compressor in the first branch, a condenser in the second branch, the second and third branches being in parallel with each other, and being coupled in fluid communication with the first branch so as to constitute with the first branch, respectively, a cooling loop and a heating loop, an expansion device interposed between the condenser and the evaporator in the cooling loop, fluid flow switching means coupled with the first, second and third branches for selectively passing fluid from the first branch into the second branch and from the first branch to the third branch, a control means coupled to the fluid flow switching means and the compressor, the control means being adapted to regulate the fluid flow rate in the heating loop by varying the compressor capacity and by operating the fluid flow switching means to selectively transfer fluid from the heating loop to the second branch when the apparatus is operating in a heating mode.

10. An apparatus for controlling air temperature in a cabin of a motor vehicle, comprising a fluid circuit having a first branch, a second branch, a third branch and a fourth branch, an evaporator and a variable capacity compressor in the first branch, a condenser in the second branch, the second and third branches being in parallel with each other, and being coupled in fluid communication with the first branch so as to constitute with the first branch, respectively, a cooling loop and a heating loop, the fourth branch being coupled in fluid communication at a first end with the second branch at a position upstream the condenser and at a second end with the first branch at a position upstream the compressor, an expansion device interposed between the condenser and the evaporator in the cooling loop, a first fluid flow switching valve coupled in fluid communication with the first, second and third branches for selectively passing fluid from the first branch into the second branch and from the first branch to the third branch, a second fluid flow switching valve coupled in fluid communication with the first branch and the second branch for selectively passing fluid from the fourth branch into the first branch, a control unit coupled to the compressor for providing specific control of the output capacity of the compressor, whereby the fluid flow rate in the heating loop may be regulated by varying the output capacity of the compressor and selectively transferring fluid from the heating loop to the second branch when the apparatus is operating in a heating mode.

11. The apparatus according to claim 10, wherein the control unit is adapted to impose the maximum value of the compressor capacity at least during start up of the apparatus in the heating mode.

12. The apparatus according to claim 11, wherein the compressor includes a mechanism for selectively imposing the maximum value of the capacity on the compressor, the control unit being adapted to actuate the mechanism.

13. The apparatus according to claim 12, wherein the compressor includes a regulating valve normally adapted to restrict the output capacity of the compressor when the apparatus is operating in the heating mode, the control unit being adapted to selectively render the regulating valve inoperable and impose the maximum value of the compressor capacity.

14. The apparatus according to claim 12, wherein the compressor includes a regulating valve normally adapted to restrict the output capacity of the compressor when the apparatus is operating in the heating mode, the control unit being adapted to adjust the regulating valve to selectively vary the compressor capacity.

15. The apparatus according to claim 10, wherein the control unit includes a temperature sensor for sensing the temperature of a stream of air which has passed through the evaporator, the control unit being adapted to adjust the capacity of the compressor in response to the temperature sensed by the sensor, whereby to achieve and maintain the temperature of the stream of air at a desired value.

16. The apparatus according to claim 10, wherein the control unit is further coupled to the first and second fluid flow switching valve for providing specific control of the transfer of fluid from the heating loop to the second branch and from the second branch to the heating loop when the apparatus is operating in the heating mode.

17. An apparatus for controlling air temperature in a cabin of a motor vehicle, comprising a fluid circuit having a first branch, a second branch, a third branch and a fourth branch, an evaporator and a variable capacity compressor in the first branch, a condenser in the second branch, the second and third branches being in parallel with each other, and being coupled in fluid communication with the first branch so as to constitute with the first branch, respectively, a cooling loop and a heating loop, the fourth branch being coupled in fluid communication at a first end with the second branch at a position upstream the condenser and at a second end with the first branch at a position upstream the compressor, an expansion means interposed between the condenser and the evaporator in the cooling loop, a first fluid flow switching means coupled in fluid communication with the first, second and third branches for selectively passing fluid from the first branch into the second branch and from the first branch to the third branch, a second fluid flow switching means coupled in fluid communication with the first branch and the second branch for selectively passing fluid from the second branch, through the fourth branch, an into the first branch, a control means coupled to the first and second fluid flow switching means and the compressor, the control means being adapted to regulate the fluid flow rate in the heating loop by selectively varying the compressor capacity and by operating the first and second fluid flow switching valves to selectively transfer fluid from the second branch to the heating loop and from the heating loop to the second branch when the apparatus is operating in a heating mode.

18. An apparatus for controlling air temperature in a cabin of a motor vehicle, comprising a fluid circuit having a first branch, a second branch, and a third branch, an evaporator and a variable capacity compressor in the first branch, a condenser in the second branch, the second and third branches being in parallel with each other, and being coupled in fluid communication with the first branch so as to constitute with the first branch, respectively, a cooling loop and a heating loop, an expansion device interposed between the condenser and the evaporator in the cooling loop, a regulating valve normally adapted to restrict the output capacity of the compressor when the apparatus is operating in a heating mode, a fluid flow switching valve coupled with the first, second and third branches for selectively passing fluid from the first branch into the second branch and from the first branch to the third branch, a control unit coupled to the fluid flow switching valve and the compressor, the control unit being adapted to regulate the fluid flow rate in the heating loop by selectively varying the output capacity of the compressor and by operating the fluid flow switching valve to selectively transfer fluid from the heating loop to the second branch when the apparatus is operating in the heating mode.

19. An apparatus for controlling air temperature in a cabin of a motor vehicle, comprising a fluid circuit having a first branch, a second branch, a third branch and a fourth branch, an evaporator and a variable capacity compressor in the first branch, a condenser in the second branch, the second and third branches being in parallel with each other, and being coupled in fluid communication with the first branch so as to constitute with the first branch, respectively, a cooling loop and a heating loop, the fourth branch being coupled in fluid communication at a first end with the second branch at a position upstream the condenser and at a second end with the first branch at a position upstream the compressor, an expansion device interposed between the condenser and the evaporator in the cooling loop, a regulating valve normally adapted to restrict the output capacity of the compressor when the apparatus is operating in a heating mode, a first fluid flow switching valve coupled in fluid communication with the first, second and third branches for selectively passing fluid from the first branch into the second branch and from the first branch to the third branch, a second fluid flow switching valve coupled in fluid communication with the first branch and the fourth branch for selectively passing fluid from the second branch, through the fourth branch and into the first branch, a control unit coupled to the first and second fluid flow switching valves and the compressor, the control unit being adapted regulate the flow rate of fluid in the heating loop by varying the output capacity of the compressor and by operating the first and second fluid flow switching valves to selectively transfer fluid from the second branch to the heating loop and from the heating loop to the second branch when the apparatus is operating in the heating mode.

\* \* \* \* \*